(12) United States Patent
Iacchetti

(10) Patent No.: US 6,334,386 B1
(45) Date of Patent: Jan. 1, 2002

(54) UTENSIL FOR COOKING FOOD

(75) Inventor: Giulio Iacchetti, Castelleone (IT)

(73) Assignee: Bialetti Industrie S.p.A., Verbania (IT)

( * ) Notice: Subject to any disclaimer, the term of this patent is extended or adjusted under 35 U.S.C. 154(b) by 0 days.

(21) Appl. No.: 09/806,244

(22) PCT Filed: Oct. 5, 1999

(86) PCT No.: PCT/IT99/00309

§ 371 Date: Jun. 6, 2001

§ 102(e) Date: Jun. 6, 2001

(87) PCT Pub. No.: WO00/19877

PCT Pub. Date: Apr. 13, 2000

(30) Foreign Application Priority Data

Oct. 5, 1998 (IT) .................................... MI980645 U

(51) Int. Cl.[7] ........................ A47J 37/00; A47J 37/07; A47J 37/10

(52) U.S. Cl. .......................... 99/425; 99/400; 99/401; 99/422

(58) Field of Search .................. 99/400, 401, 422–425, 99/444–450, 413–415; 126/390.1; 16/110.1, 111.1, 422, 425, 430; 220/573.2, 912; 428/164, 251, 406, 432, 201

(56) References Cited

U.S. PATENT DOCUMENTS

| | | | | |
|---|---|---|---|---|
| 1,757,989 A | * | 5/1930 | Acton ..................... 126/390.1 |
| 2,618,258 A | * | 11/1952 | Kroyer ..................... 99/422 X |
| 3,473,952 A | * | 10/1969 | McFadden ................ 220/573.2 |
| 3,908,534 A | | 9/1975 | Martin ......................... 99/418 |
| 4,014,129 A | * | 3/1977 | Capra ..................... 99/422 X |
| 4,331,251 A | | 5/1982 | Berman et al. ............. 220/4 B |
| 4,574,777 A | * | 3/1986 | Bohl et al. .................... 99/425 |
| 4,653,468 A | * | 3/1987 | Lemme et al. ........ 126/390.1 X |
| 4,768,427 A | * | 9/1988 | Cheng ......................... 99/422 |
| 5,313,735 A | * | 5/1994 | Latouche .................. 99/449 X |
| 5,365,832 A | * | 11/1994 | Gaydoul ....................... 99/422 |
| 5,373,608 A | * | 12/1994 | Welch ..................... 99/403 X |
| 5,465,652 A | | 11/1995 | Hymes ......................... 99/400 |
| 5,673,458 A | * | 10/1997 | Raoult .......................... 16/425 |
| 5,715,570 A | * | 2/1998 | Hyon ........................ 16/110.1 |

FOREIGN PATENT DOCUMENTS

| | | |
|---|---|---|
| CH | 533443 | 2/1973 |
| DE | 29605888 | 5/1996 |
| EP | 515705 A1 | 12/1992 |
| GB | 372025 A | 5/1932 |

OTHER PUBLICATIONS

European Search Report dated Jan. 26, 2000.

* cited by examiner

Primary Examiner—Timothy F. Simone
(74) Attorney, Agent, or Firm—Sofer & Haroun, LLP

(57) ABSTRACT

A untensil (10) for cooking food, with raised portions (13) in its interior for a cooking with aesthetic characteristics similar to those produced by cooking on a grill, is provided with such raised portions (13) both on its base (11) and on its rim (12'), for improved cooking.

5 Claims, 5 Drawing Sheets

UTENSIL FOR COOKING FOOD

CROSS-REFERENCE TO RELATED APPLICATIONS

This application is a National Stage of, and claims the benefit of priority to, International Application No. PCT/IT99/00309 filed on Oct. 5, 1999, which claims the benefit of priority to Italian Patent Application No. MI98U 000645 filed on Oct. 5, 1998, which is incorporated by reference herein as fully as if set forth in its entirety.

DESCRIPTION

The subject of the present invention is a utensil for cooking food.

Cooking utensils having series of raised portions in their bases for enabling food to be cooked so as to achieve a final aesthetic effect of the cooking corresponding to that produced by cooking on a grill are known.

The object of the present invention is to propose a utensil of the type described above which permits even better cooking of the food than that offered by known utensils.

This object is achieved by means of a utensil for cooking food comprising a base and a rim, the base having raised portions on the inside of the utensil, characterized in that the rim also has raised portions on the inside of the utensil.

The invention will be understood better from the following description of a non-limiting embodiment thereof, illustrated in the appended drawings, in which.

Figure 1:
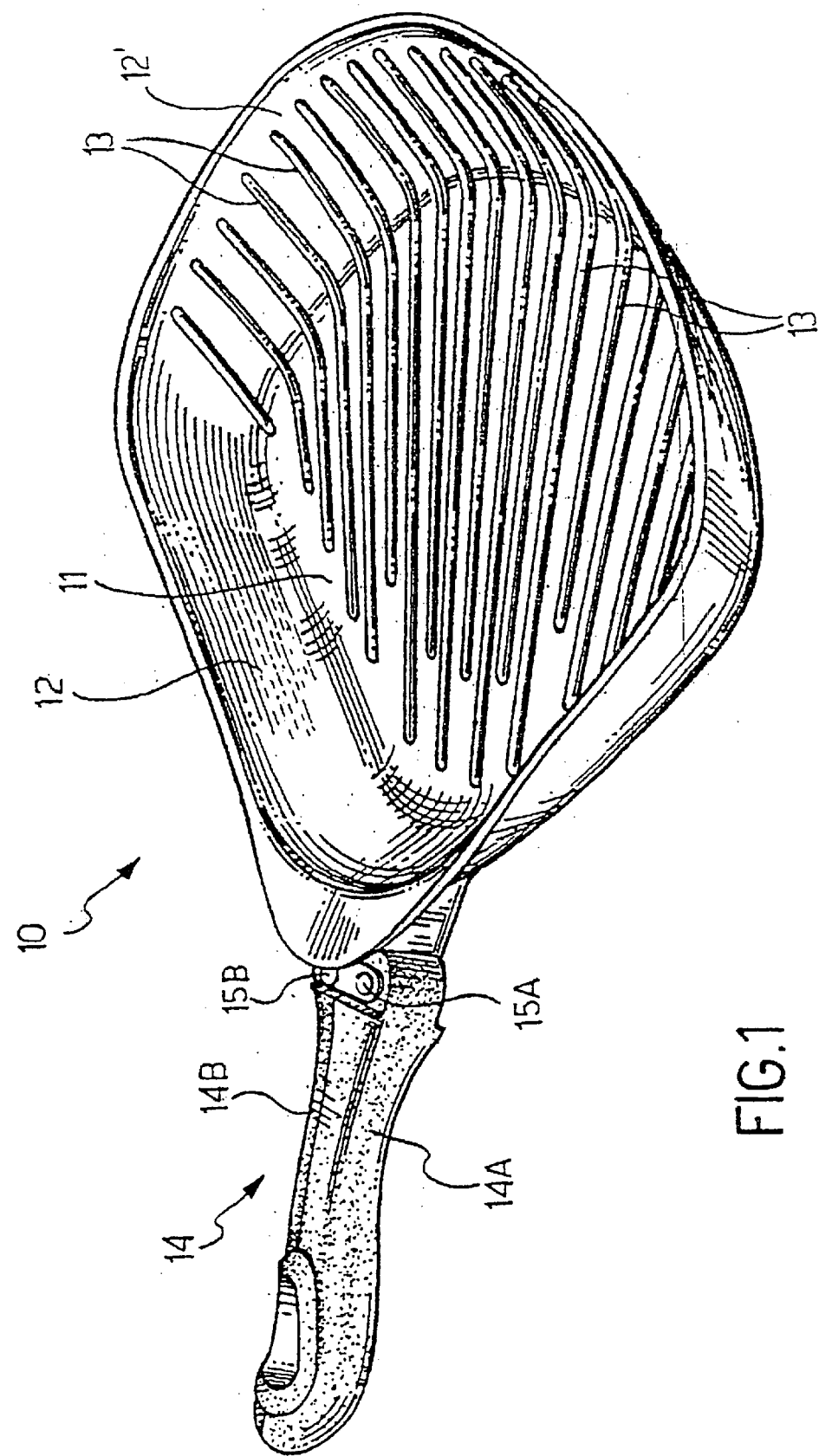
FIG. 1 is a perspective view of a cooking utensil according to the invention.
Figure 2:
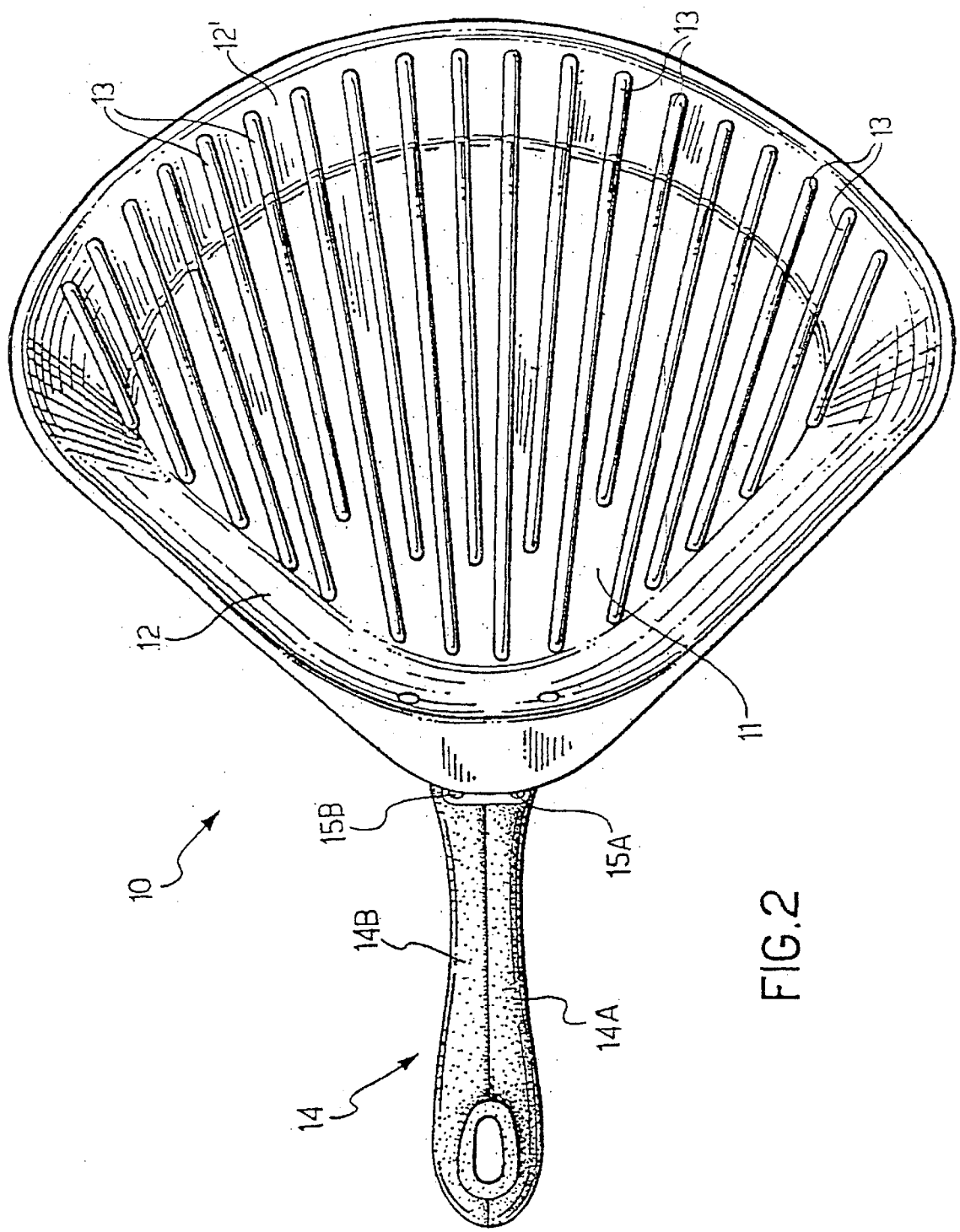
FIG. 2 is a plan view of the cooking utensil of FIG. 1.
Figure 3:
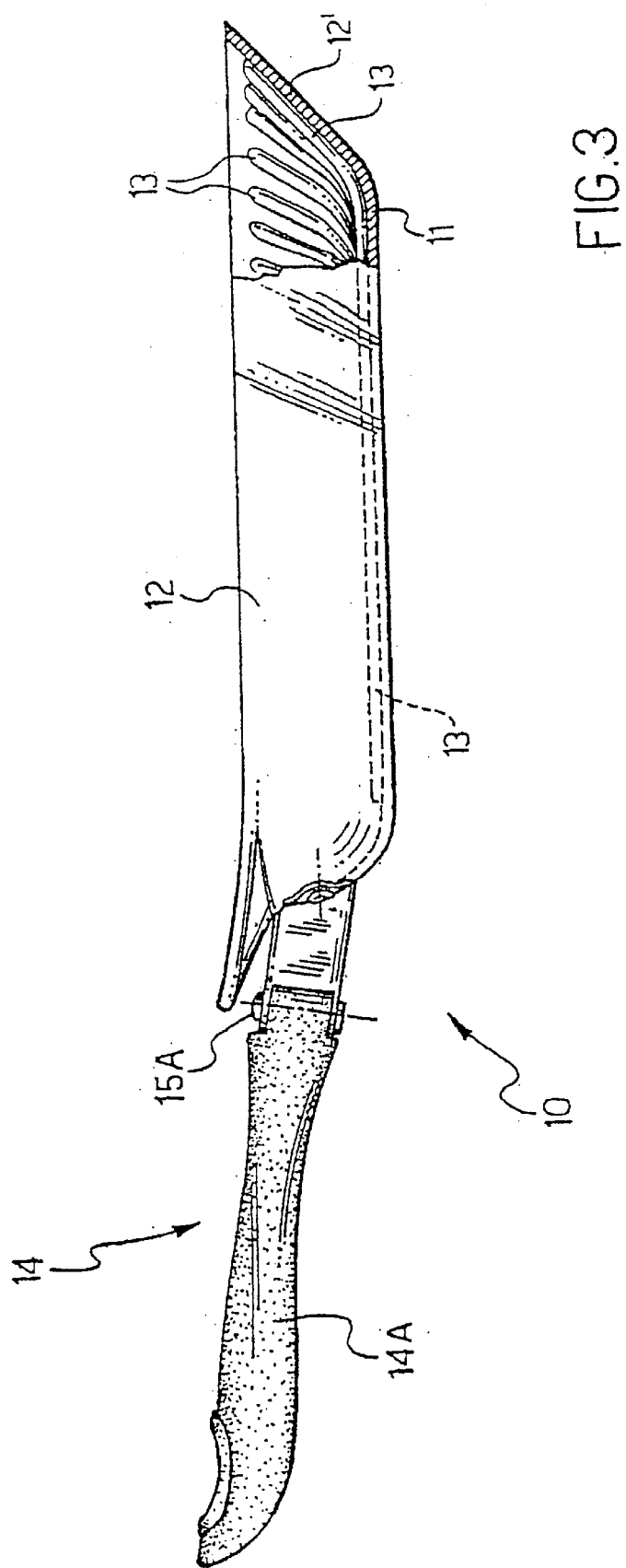
FIG. 3 is a partially-sectioned side view of the utensil of FIG. 1.

The utensil illustrated, which is generally indicated 10 and is intended for cooking food, comprises a base 11 and a rim 12 and has a configuration in plan substantially similar to a sector of a circle.

The utensil 10 has, on its inside, a series of raised portions 13 which extend from the vertex of the circle sector substantially radially along the base 11 and the arcuate front portion 12' of the rim 12 of the utensil. As explained above, these raised portions enable food to be cooked with a final aesthetic effect of the cooking corresponding to that produced by cooking on a grill.

The arcuate front portion 12' of the rim 12 is inclined forwards, preferably at an angle of about 300 to the vertical.

Figure 4:
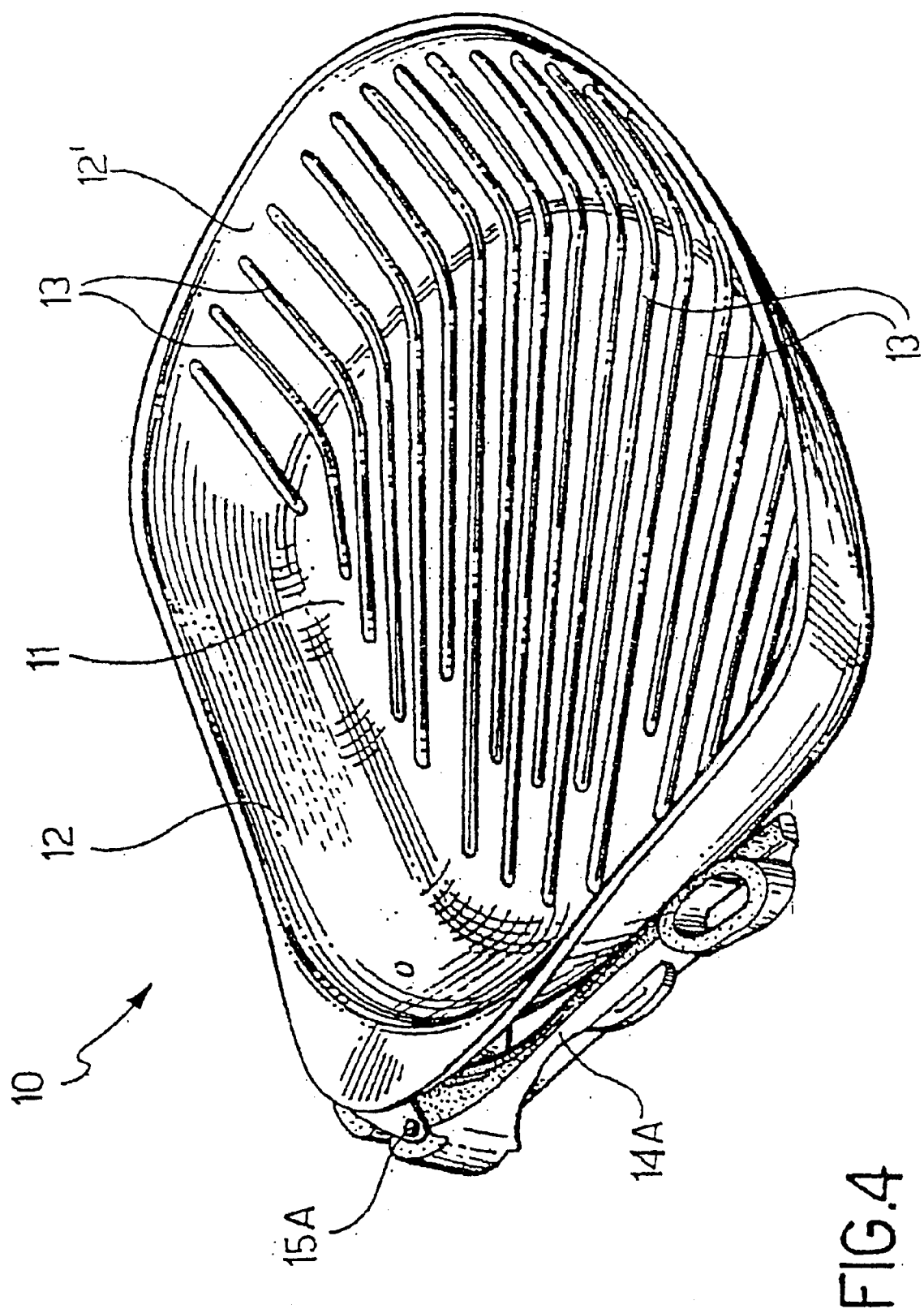
FIGS. 4 and 5 show the above-mentioned utensil, as illustrated in FIGS. 1 and 2, respectively, with the handle in the rest position.
Figure 5:
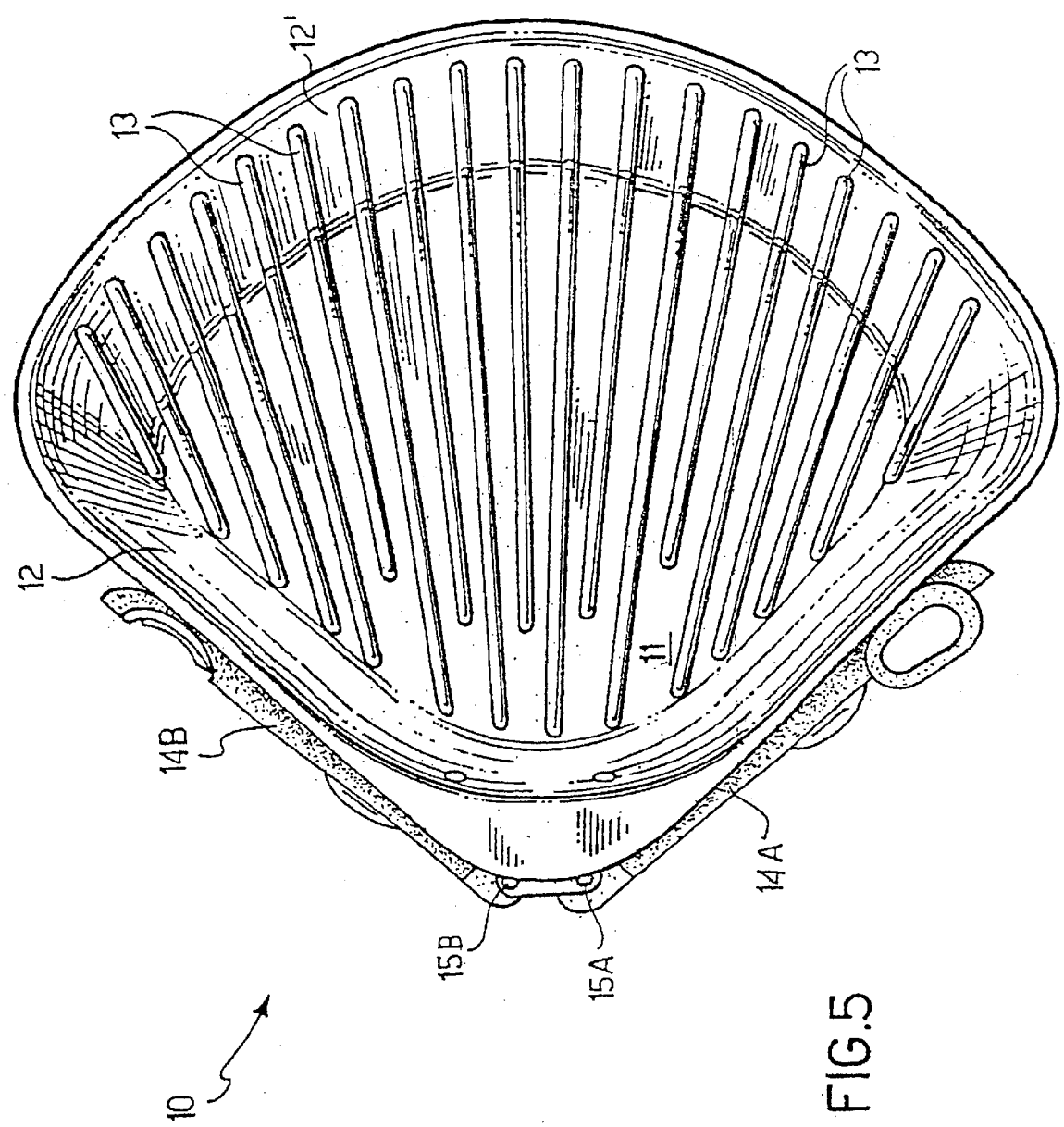

At the vertex of the circle sector, the utensil 10 has a handle 14 composed of two portions 14A, 14B into which the handle is divided along a substantially longitudinal axis and which fit together along this longitudinal axis. Each of the handle portions 14A, 14B is pivoted to the body of the utensil 10 about a pin, indicated 15A for the portion 14A and 15B for the portion 14B. This pivoting enables the two handle portions 14A, 14B to rotate between a working position in which they fit together to form a single handle fixed to the body of the utensil 10, and a rest position, shown in FIGS. 4 and 5, in which the handle portions are arranged against the body of the utensil 10.

The fact that the raised portions 13 are also present on the front portion 12' of the rim 12 of the utensil 10 enables better cooking of the food to be achieved since this portion of the utensil is also utilized.

The arcuate front portion 12' of the rim 12 and its forward inclination lead to two important advantages. First of all, they optimize the cooking space by increasing its area. They also enable the food to be emptied out onto a plate easily; the cooked food is thus supported and is prevented from breaking up and hence being presented in an aesthetically unattractive manner.

The embodiment of the utensil 10 described and illustrated and the fact that the two handle portions 14A, 14B can be folded enable the utensil to be very compact so that it takes up little space in the kitchen cabinet or in the dishwasher in which it is placed, and so that it does not interfere with other utensils.

The raised portions on the base and on the rim may have a configuration, a shape, or an arrangement other than those described and illustrated and may also vary in number. For example, the raised portions may be parallel to one another, or may intersect, and so on. Moreover, the raised portions may affect all or only part of the inside of the base and/or the rim of the utensil. It should, however, be stressed that the embodiment of the raised portions which has been described and illustrated has been found particularly effective.

The configuration of the utensil may also vary. For example, it may have a conventional circular shape. The inclination of the rim of the utensil may also vary. In this case also, it should, however, be stated that the configuration of the utensil which has been described and illustrated has been found particularly effective.

The handle of the utensil may also have any configuration. Moreover, it may be in a single piece and may be foldable or fixed. Several handles may also be provided. However, the embodiment described and illustrated achieves a considerable reduction in the space occupied by the utensil.

What is claimed is:

1. A utensil (10) for cooking food, comprising a base (11) and a rim (12), the base (11) and the rim having raised portions (13) on the inside of the utensil, characterized by a configuration in plan substantially similar to a sector of a circle with two substantially rectilinear rims and with an arcuate rim (12'), wherein the arcuate rim (12') is provided with the raised portions (13) and is inclined outwardly to form with the base (11) a continuous cooking surface, and characterized by a handle (14) extending radially from the vertex of the circle sector and formed by two portions (14A, 14B) which fit together in a working position and which are pivoted to the utensil in order to rotate to a rest position in which each portion (14A; 14B) of the handle (14) is disposed against the body of the utensil along the two rectilinear rims.

2. A utensil according to claim 1, wherein the raised portions (13) of the base (11) and of the rim (12') are contiguous, without breaks in continuity.

3. A utensil according to claim 1, wherein the raised portions (13) extend substantially radially from the circle sector.

4. A utensil according to claim 1, wherein the front rim (12') is inclined at about 30 degrees to the vertical.

5. A utensil according to claim 3, wherein the front rim (12') is inclined at about 30 degrees to the vertical.

* * * * *